3,346,236
LIVE LINE TENSION TOOL ASSEMBLY
David C. Hubbard and James K. Harper, Centralia, and Robert L. Lynch, Harrisburg, Mo., and Robert B. Boehmer, Wheaton, Ill., assignors to A. B. Chance Company, Centralia, Mo., a corporation of Missouri
Filed Sept. 13, 1965, Ser. No. 486,675
11 Claims. (Cl. 254—67)

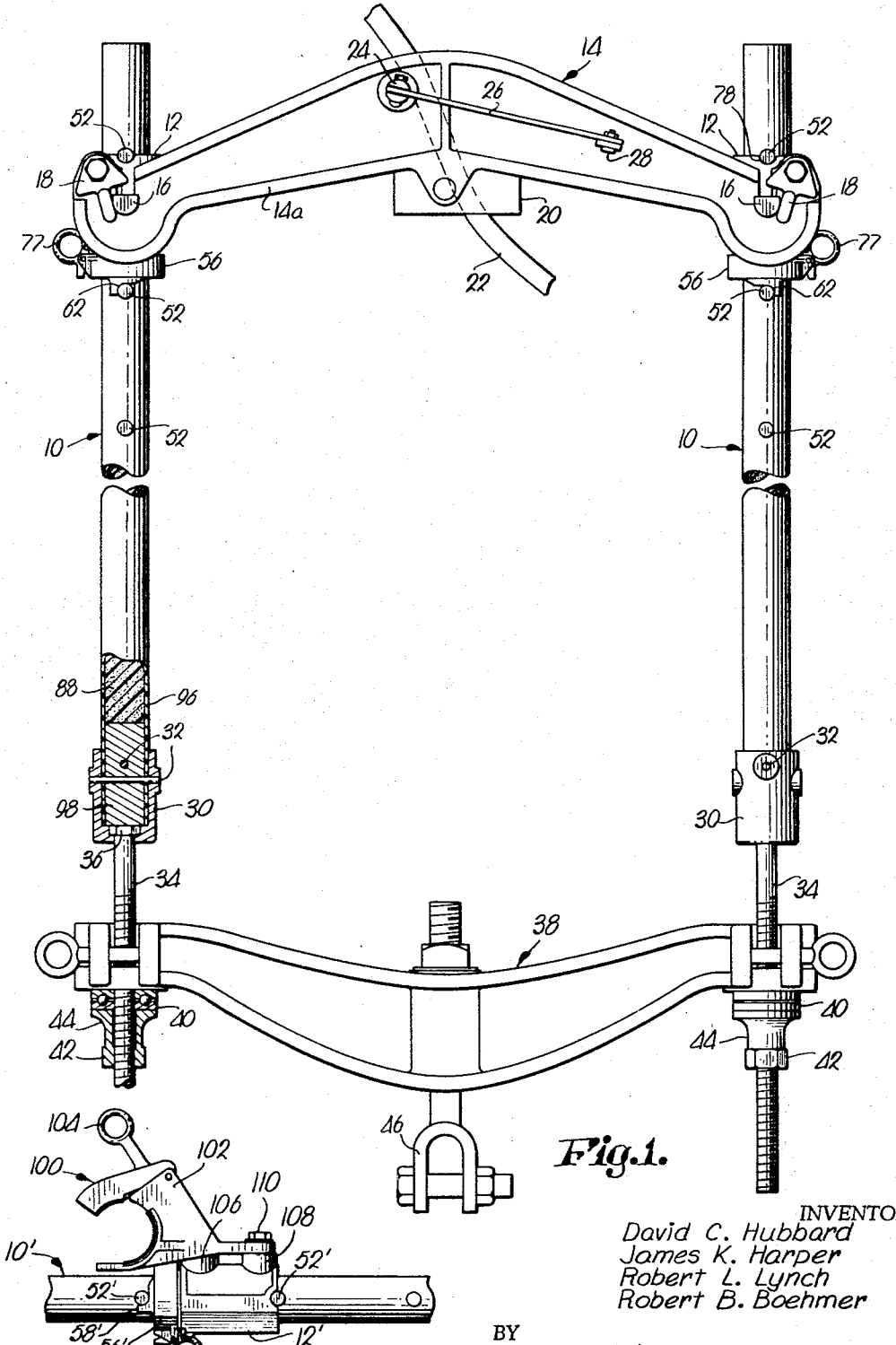

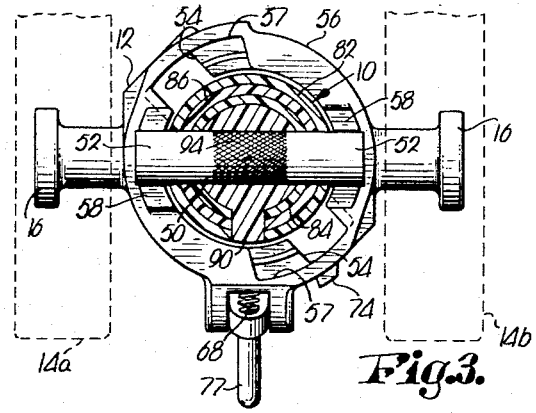
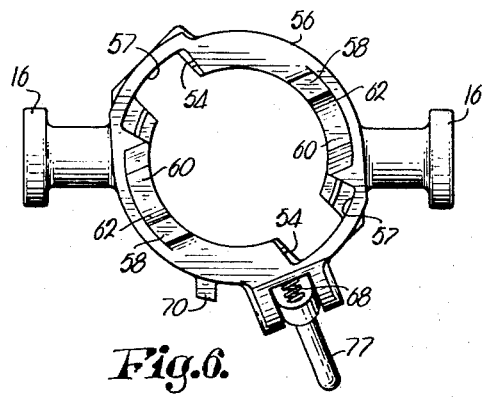
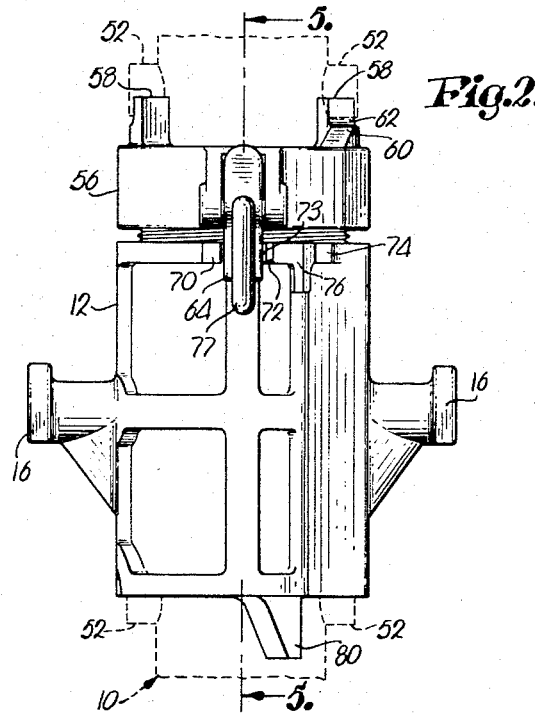
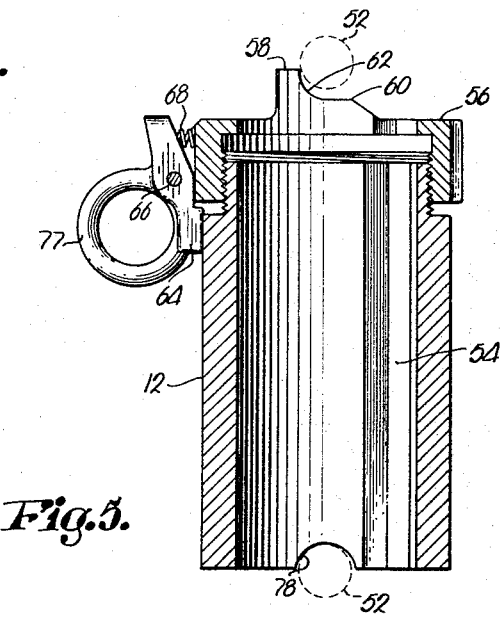
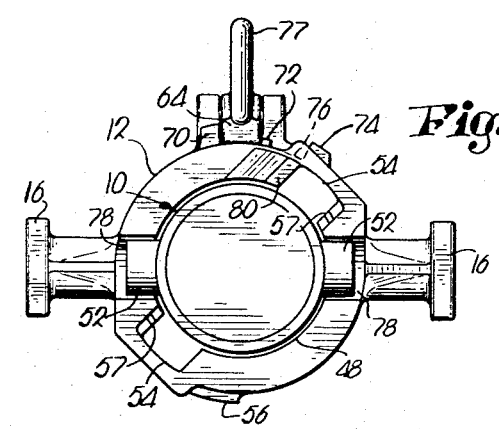
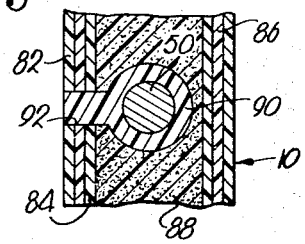
INVENTORS.
David C. Hubbard
James K. Harper
Robert L. Lynch
Robert B. Boehmer United States Patent Office 3,346,236
Patented Oct. 10, 1967

This invention relates to improvements in multipurpose tools for use in handling energized, high voltage electrical lines during repair and maintenance operations.

Strain carriers of the type shown and described in D. C. Hubbard, U.S. Letters Patent No. 2,654,796, granted October 6, 1953, and entitled "Dead-End Strain Carrier" have been utilized for a number of years as a means of relieving the strain on supporting tower insulators during replacement thereof while the current carrying conductors remain energized. Tension tools of this type also find widespread use for a number of applications wherein energized conductors must be handled by a lineman at the tower site, depending on the particular tool fixture utilized with the two tensioning poles of the tool assembly.

As in the aforesaid patent, it has been common practice to provide tensioning poles of wooden construction. Since these poles serve as the isolating insulator between the conductor and the tower structure to which one end of the pole pair is coupled, a difficulty is encountered in the use of wooden poles in that such poles must be kept moisture free in order to maintain required insulation levels. Additionally, prior art tool assemblies such as described in the aforesaid patent require adjustment at ground level and cannot be readily readjusted at the site of use in the tower.

It is, therefore, an object of this invention to provide a tensioning pole for live line strain tools of nonhydroscopic material to avoid moisture absorption or entrapment along the length of the pole so that required insulation levels may be readily maintained.

Another object of the instant invention is to provide novel means operable by the lineman during use of the tool for adjusting the position of the tool fixture longitudinally of the tensioning poles as may be required by the number of insulators in the line and the hardware employed.

Still another object of this invention is to provide a means of permitting the aforesaid longitudinal adjustment without the need to disassemble the tool set for this purpose.

A further object of this invention is to provide a tool assembly including a tensioning pole and a tubular slide receiving the pole, the slide and the pole being relatively shiftable to any one of a number of positions, and wherein means is employed which is operable by a lineman's stick to lock the slide in a selected position, the slide being provided with means which universally adapts the slide to receive and support a variety of tool attachments.

Other objects will become apparent as the detailed description proceeds.

In the drawings:

FIG. 1 is a plan view of a live line tool assembly embodying the features of the instant invention;

FIG. 2 is a side view of the tubular slide of the instant invention showing the same locked at a selected position on the tensioning pole illustrated fragmentarily by broken lines;

FIG. 3 shows the tensioning pole in transverse cross section and is an end view of the slide, the yoke plates being shown in broken lines;

FIG. 4 is an end view of the slide looking in the opposite direction as compared with the view of FIG. 3;

FIG. 5 is a longitudinal sectional view taken along line 5—5 of FIG. 2;

FIG. 6 is an end view similar to FIG. 3 except that the locking ring of the slide is illustrated shifted to a position permitting relative movement of the slide and the pole (not shown);

FIG. 7 is a fragmentary, longitudinal cross-sectional view of the tensioning pole; and FIG. 8 is a fragmentary view of another type of tool assembly embodying the features of the instant invention.

FIGURE 1 shows a tool assembly comprising a pair of tensioning poles 10 received by tubular slides 12 which carry a conventional strain carrier yoke 14. As illustrated in FIG. 3, yoke 14 is of double plate construction and comprises a pair of parallel yoke plates 14a and 14b, the ends of the plates being slotted to receive opposed trunnions 16 projecting from slides 12. A spring-loaded latch 18 at each end of yoke plate 14a engages the associated trunnion 16 to secure yoke 14 to the slides.

A conductor gripping attachment 20 is located between the parallel plates 14a and 14b and receives a conductor 22. A locking rod 24 is axially reciprocable in directions perpendicular to the plane of the drawing of FIG. 1 and is coupled to a lift arm 26 pivotal about pivot pin 28.

The end of each pole 10 remote from yoke 14 is provided with a ferrule 30 secured to the pole by a pair of crosspins 32. A screw member 34 extends from each ferrule 30, each member 34 being provided with a head 36 which is seated in an internal recess in the ferrule to prevent separation of the screw member therefrom.

A tower end yoke 38 spans the distance between screw members 34 and is shiftable with respect thereto. A thrust bearing 40 is telescoped over each member 34 and engages the associated end of yoke 38 as illustrated. A takeup nut 42 on member 34 applies pressure to thrust bearing 40 through an integral spacer 44 in engagement with the bearing. A clevis and bolt 46 is attached to the central portion of yoke 38 to provide a means of coupling the yoke with a structural member of the supporting tower of conductor 22, such as by a clamp or chain (not shown).

Referring particularly to FIGS. 3–6, it may be seen that the tubular slide 12 is in the form of a sleeve having an internal bore 48 of slightly greater diameter than the diameter of pole 10. The composition of the pole will be described in detail hereinafter, it being sufficient to note at this juncture that the pole is provided with a series of crosspins 50 extending therethrough and spaced longitudinally therealong at regular intervals (FIG. 1). The ends of each pin 50 extend from pole 10 and present a pair of opposed studs or lugs 52. Studs 52 are aligned with one another longitudinally of the pole and define a plurality of positions at which slide 12 may be locked in place.

Slide 12 has a pair of opposed, interior clearance passages or channels 54 extending longitudinally thereof and adapted to receive studs 52 to permit movement of the slide along the pole. A locking ring 56 is threaded on one end of slide 12 and is rotatable with respect thereto between a pair of positions best illustrated by a comparison of FIGS. 3 and 6. In FIG. 3 ring 56 is shown in a position which locks slide 12 to the pole at a selected location; FIG. 6 shows ring 56 in its unlocked position which permits free movement of the slide. Ring 56 is provided with a pair of internal, opposed grooves 57 which are in register with channels 54 when the ring is either in its locked or unlocked position.

Locking action is provided by a pair of projections 58 which extend from the end surface of ring 56 longitudinally of the pole as illustrated in FIGS. 2 and 5. A cam 60 is integrally formed with each projection and the end surface of the ring, there being a recess 62 formed in the camming surface as the same joins projection 58.

It will be appreciated that cams 60 face oppositely so as to move into engagement with respective studs 52 upon rotation of ring 56 in a clockwise direction as viewed in FIGS. 3 and 6.

A latch 64 is pivotally mounted on ring 56 by a pivot pin 66 and is biased by a spring 68 toward the position illustrated in FIG. 5. In this position, latch 64 is sandwiched between a pair of lateral protuberances 70 and 72 which form a catch or seat 73 therebetween for latch 64 when the ring 56 is in the locked position. An additional protuberance 74 defines a catch or seat 76 with protuberance 72 to maintain latch 64 in the unlocked position when free movement of slide 12 along the pole is desired during adjustment of the tool assembly. An eye 77 integral with latch 64 is provided to facilitate movement of the ring by a lineman's hookstick.

The end of slide 12 opposite locking ring 56 is provided with a pair of opposed semicircular notches 78 in its periphery which receive an adjacent pair of opposed studs 52 when it is desired to lock the slide in place on the pole. A stop 80 extends from this end of the slide to limit the rotation of the slide with respect to the pole when it is desired to lock the slide in place as will be explained hereinafter.

The construction of each pole 10 is similar to the insulating rod structure shown and described in M. H. Fink, U.S. Letters Patent No. 2,997,529, granted August 22, 1961, and entitled "Electrical Insulating Rod." As illustrated in FIG. 7, a double-wall construction is utilized for added strength since the pole must not be weakened by the insertion of pins 50 thereinto. The two concentric walls are shown at 82 and 84 and comprise a fiber glass reinforced synthetic resin substance. The two walls are separated by a layer 86 of epoxy resin, the core 88 of the pole comprising a solidified unicellular synthetic resin. The particular constituents which may be utilized in the formation of walls 82 and 84 and core 88 are set forth in the aforesaid Fink patent, which is incorporated herein by reference as may be required for a full and complete understanding of the construction of the walls and core of pole 10.

The pins 50 are joined to the pole 10 by boring transverse holes through the pole and inserting the pins thereinto along with an epoxy filler 90. Filler 90 is injected into the pole through a transverse gate or opening 92 through walls 82 and 84 and fills a cavity surrounding the pin which is bored out of the foam core 88.

It may be noted in FIG. 3 that the central portion 94 of pin 50 is knurled. This is to assist in establishing a solid bond between the pin and the epoxy filler 70. The filler is injected when the same is in the liquid state and then permitted to solidify in intimate contact with the knurled portion 94 of the pin.

Referring to FIG. 1, it may be seen that only a single wall 96 is utilized with core 88 after a point on the pole is reached where pins are not provided. In order to provide a means of securely attaching ferrule 30 to the end of the pole adjacent yoke 38, a wooden plug 98 is employed in lieu of core 88 in order to firmly seat pins 32 which anchor the ferrule on the pole.

In operation, yoke 38 is attached to a structural member of the supporting tower through the use of the clevis and bolt arrangement 46, and the yoke 14 is attached to the current carrying conductor 22 in the conventional manner. In FIG. 1, slides 12 are illustrated locked to poles 10 in their end positions remote from yoke 38. It should be noted that the studs 52 adjacent the free ends of the poles are seated in notches 78 of respective slides, while the next set of studs 52 are seated in the recesses 62 of respective slides. This positional relationship is shown in detail in FIG. 5.

Each slide 12 is held against movement on the pole because of the effect of cams 60 which seat one set of studs 52 in recesses 62 while the adjacent pair of studs is seated in notches 78. Thus, relative movement of the pole and the slide is impossible; latch 64 is seated in catch 73 and held in place by spring 68 to prevent movement of locking ring 56.

In order to adjust the positions of the slides on the poles, each pole is shifted individually to the desired position. This is usually accomplished prior to interconnection of both of the slides with yoke 14 and, therefore, prior to operation of the tool to exert force on conductor 22.

With yoke 14 in place on the conductor and attached to one of the slides 12, movement of the pole to a different position is easily effected by the operating lineman through the use of a hookstick. The hook is inserted in eye 77 to raise latch 64 against the action of spring 68 and rotate ring 56 to the unlocked position illustrated in FIG. 6. At this time, latch 64 is seated in catch 76; it is readily apparent that only a slight rotation of ring 56 is necessary to effect the unlocking operation.

With the ring unlocked, cams 60 are effectively removed from beneath studs 52 (as viewed in FIGS. 2 and 5) so that the pole may be longitudinally shifted within slide 12 a short distance to free the other pair of studs 52 from notches 78. This frees the slide so that the pole may be rotated through a small angular displacement until channels 54 and grooves 57 are aligned with studs 52. Such alignment is readily effected by manually grasping pole 10 and rotating the latter. The pole may then be shifted through the slide to a desired location, whereupon a slight rotation of the pole again seats a pair of studs in notches 78. Subsequent movement of ring 56 to its locked position returns the device to the positional relationship with respect to the two pairs of adjacent studs illustrated in FIGS. 2 and 5.

The second slide may then be moved in position on the other pole 10 and the yoke attached thereto in the conventional manner. It should be appreciated that the latches 18 are provided with eyelets so that the same are readily operated by the hookstick. The tool is then utilized as a strain relief assembly by tightening takeup nuts 42 to pull conductor 22 toward yoke 38 and thus relieve the normal tension on support insulators connected to the conductor.

In FIG. 8 an adjustable suspension link stick is shown fragmentarily and illustrates an adaptation of the invention to a type of live line tool assembly requiring only a single pole and slide combination. The pole 10' and the slide 12' are identical in construction to the pole 10 and slide 12 described hereinabove, except for a modification to be discussed hereinafter; hence, the same reference numerals (with the addition of the prime notation) are employed as appear in FIGS. 1–6.

The tool attachment of the FIG. 8 assembly comprises a suspension clamp 100 having a clamp body 102, and an adjustment eye 104. Instead of being provided with trunnions 16 as in FIGS. 1–6, slide 12' has a pair of longitudinally spaced bosses 106 and 108 which serve as a mount for clamp body 102. A pivot bolt 110 secures body 102 to boss 108, boss 106 cooperating with components (not shown) of clamp 100 to permit pivoting of the clamp about bolt 110 to a position at a 90° angle to the axis of pole 10'. This permits alignment of the clamp with a conductor so that the clamp may be seated thereagainst prior to tightening thereof by operation of eye 104. As in the tool assembly shown in FIG. 1, the effective length of pole 10' may be adjusted as required by locking slide 12' to appropriate adjacent sets of studs 52'.

From the foregoing it will be appreciated that the instant invention is adaptable for use with many forms of tool fixtures or attachments depending upon the particular application, as illustrated by the two exemplary tool types shown in FIGS. 1 and 8. The assembly provides ultimate mechanical and electrical security with minimal maintenance and does not require dry rooms, heated transport trailers, or other special facilities to avoid moisture absorption with resultant loss in electrical insulating qualities. Adjustments are provided without the employment of moisture and dirt trapping openings or chambers in the insulated poles. Furthermore, all adjustments may be effected through the use of a lineman's stick at the operating site which may, of course, be in difficult locations such as above ground in the tower structure utilized to support high voltage transmission lines.

Having thus described the invention, what is claimed as new and desired to be secured by Letters Patent is:

1. In a live line tool assembly:
an insulated pole;
a slide mounted on said pole for relative movement of the slide and the pole and provided with means for coupling the slide with a tool;
a series of aligned studs extending laterally from said pole and spaced longitudinally thereof,
said studs defining a plurality of locations for attachment of the slide to the pole; and
shiftable lock means carried by said slide for holding the latter against movement relative to the pole when the slide is at any of said locations,
said lock means being disposed for engagement with the stud associated with a selected location upon relative movement of the slide and the pole to dispose the slide at said selected location, whereby operation of the lock means maintains the slide at the selected location and, upon release thereof, permits selective positioning of the slide on the pole.

2. The invention of claim 1,
said pole comprising a fiber glass reinforced synthetic resin material,
said studs extending into said pole; and
filler means in said pole in intimate contact with said studs and bonding the same to said material.

3. The invention of claim 2,
each of said studs having a knurled portion in the pole in contact with said filler means.

4. The invention of claim 1,
said pole comprising a tubular, fiber glass reinforced synthetic resin wall having a unicellular, solidified synthetic resin foam core,
said studs extending into said pole,
said core having cavities therein receiving respective studs; and
a synthetic resin bonding agents in said cavities in intimate contact with said studs.

5. In a live line tool assembly:
an insulated pole;
a tubular slide receiving said pole and provided with means for coupling the slide with a tool;
a series of aligned studs extending laterally from said pole and spaced longitudinally thereof,
said studs defining a plurality of locations for attachment of the slide to the pole,
said slide having a longitudinal clearance passage permitting relative movement of the slide and the pole to dispose the slide at each of said locations when the passage is aligned with said studs; and
shiftable lock means carried by said slide for holding the latter against movement relative to the pole when the slide is at any of said locations and upon relative rotation of the slide and the pole to move the passage and the studs out of alignment with one another,
said lock means being disposed for engagement with the stud associated with a selected location upon relative movement of the slide and the pole to dispose the slide at said selected location, whereby operation of the lock means maintains the slide at the selected location and, upon release thereof, permits selective positioning of the slide on the pole.

6. The invention of claim 5,
said slide having notch means for receiving another of said studs when the slide is at said selected location and said passage is out of alignment wtih said studs,
said lock means being shiftable toward and away from a position maintaining said other stud seated in said notch means.

7. The invention of claim 6,
said notch means being disposed to prevent relative rotative movement of the slide and the pole when said other stud is seated therein,
said lock means having a cam for engaging the first mentioned stud, when said other stud is seated in said notch means, to prevent relative shifting of said first mentioned stud and said slide in a direction to unseat said other stud from the notch means.

8. The invention of claim 5,
said slide having notch means for receiving another of said studs when the slide is at said selected location and said passage is out of alignment wtih said studs,
said lock means including a ring rotatably mounted on said slide in circumscribing relationship to said pole and shiftable between an unlocked position and a locked position, latch means coupled with said ring for releasably maintaining the latter in either of said positions, and a cam carried by said ring for engaging the first mentioned stud, when said other stud is seated in said notch means, to prevent relative shifting of said first mentioned stud and said slide in a direction to unseat said other stud from said notch means.

9. In a live line tool assembly:
an insulated pole;
a tubular slide receiving said pole and provided with means for coupling the slide with a tool;
a series of crosspins in the pole presenting opposed pairs of aligned studs extending laterally from the pole and spaced longitudinally thereof,
said pairs of studs defining a plurality of locations for attachment of the slide to the pole,
said slide having a pair of opposed, internal, longitudinal clearance passages permitting relative movement of the slide and the pole to dispose the slide at each of said locations when the passages are aligned with said studs; and
shiftable lock means carried by said slide for holding the latter against movement relative to the pole when the slide is at any of said locations and upon relative rotation of the slide and the pole to move the passages and the studs out of alignment with one another,
said lock means including a ring rotatably mounted on said slide in circumscribing relationship to said pole and shiftable between an unlocked position and a locked position, latch means coupled with said ring for releasably maintaining the latter in either of said positions, and a cam carried by said ring and engageable with the pair of studs associated with a selected location upon relative movement of the slide and the pole to dispose the slide at said selected location,
said slide having notch means for receiving another of said pairs of studs when the slide is at said selected location and said passages are out of alignment with said studs,
said cam being disposed to prevent relative shifting of said first mentioned pair of studs and said slide in a direction to unseat said other pair of studs from said notch means upon movement of said ring to said locked position when the slide is at said selected location.

10. The invention of claim 9,
said locking ring being mounted on one end of said slide, said notch means being disposed in the other end of said slide in angularly spaced relationship to said passages.

11. The invention of claim 9, said pole comprising a fiber glass reinforced synthetic resin material, said crosspins extending through said pole; and filler means in said pole in intimate contact with said crosspins and bonding the same to said material.

References Cited

UNITED STATES PATENTS

| | | | |
|---|---|---|---|
| 2,162,070 | 6/1939 | Dunaway | 254—67 |
| 2,319,587 | 5/1943 | Conrad | 254—67 |
| 2,613,913 | 10/1952 | Hubbard | 254—67 |
| 2,654,796 | 10/1953 | Hubbard | 254—67 |

OTHELL M. SIMPSON, *Primary Examiner.*